(12) United States Patent
Makita

(10) Patent No.: US 7,480,818 B2
(45) Date of Patent: Jan. 20, 2009

(54) DATA STORAGE DEVICE, RECONSTRUCTION CONTROLLING DEVICE, RECONSTRUCTION CONTROLLING METHOD, AND STORAGE MEDIUM

(75) Inventor: Takeshi Makita, Kanagawa (JP)

(73) Assignee: Sony Corporation, Tokyo (JP)

( * ) Notice: Subject to any disclaimer, the term of this patent is extended or adjusted under 35 U.S.C. 154(b) by 486 days.

(21) Appl. No.: 11/397,171

(22) Filed: Apr. 4, 2006

(65) Prior Publication Data

US 2006/0224560 A1  Oct. 5, 2006

(30) Foreign Application Priority Data

Apr. 5, 2005  (JP) ............................. P2005-108250

(51) Int. Cl.
*G06F 11/00* (2006.01)
(52) U.S. Cl. .............................. 714/6; 714/42; 711/114
(58) Field of Classification Search ...................... 714/6, 714/42; 711/114
See application file for complete search history.

(56) References Cited

U.S. PATENT DOCUMENTS 7,353,423 B2 * 4/2008 Hartline et al. ................ 714/6
2002/0083379 A1 * 6/2002 Nishikawa et al. .......... 714/710
2006/0075283 A1 * 4/2006 Hartung et al. ................ 714/5
2006/0224560 A1 * 10/2006 Makita ........................... 707/1
2006/0224916 A1 * 10/2006 Makita ........................... 714/6
2007/0028042 A1 * 2/2007 Hetrick et al. ............... 711/114

* cited by examiner

*Primary Examiner*—Emerson C Puente
(74) *Attorney, Agent, or Firm*—Frommer Lawrence & Haug LLP; William S. Frommer

(57) ABSTRACT

The present invention provides a method including a step of determining whether a number of storage media usable for one of input and output of processing data is not smaller than one plus a number of storage media necessary for one of input and output of processing data when a request for reconstruction of stored data is detected, a step of identifying storage media to be operated of the usable storage media when a positive result is obtained, a step of specifying one of the storage media to be operated as a storage medium for reconstruction and the other storage media as storage media for one of the input and output of the processing data, and shifting specification of the storage medium for reconstruction in each command cycle, and a step of performing one of the input and output of the processing data and reading of a processing unit for reconstruction in parallel with each other in accordance with the specification of the storage media, and reconstructing the stored data and recording the reconstructed stored data on a storage medium as a reconstruction destination in a stage in which all of processing units necessary to reconstruct the stored data are prepared.

10 Claims, 11 Drawing Sheets

DATA STORAGE DEVICE, RECONSTRUCTION CONTROLLING DEVICE, RECONSTRUCTION CONTROLLING METHOD, AND STORAGE MEDIUM

CROSS REFERENCES TO RELATED APPLICATIONS

The present invention contains subject matter related to Japanese Patent Application P2005-108250 filed with the Japanese Patent Office on Apr. 5, 2005, the entire contents of which being incorporated herein by reference.

BACKGROUND OF THE INVENTION

One form of the present invention relates to a data storage device capable of inputting or outputting processing data even when a plurality of storage media are faulty simultaneously.

Another form of the present invention relates to a reconstruction controlling device that controls an operation of reconstructing stored data in the above-described data storage device.

Another form of the present invention relates to a reconstruction controlling method that controls an operation of reconstructing stored data in the above-described data storage device.

Another form of the present invention relates to a storage medium for storing a program that implements an operation of reconstructing stored data in the above-described data storage device.

A data storage device handing a large amount of digital data on a daily basis uses a processing technique that can read and write processing data at high speed and a processing technique that enhances availability.

For example, the processing technique that can read and write processing data at high speed uses a striping system. The striping system refers to a technical method that divides one piece of processing data into a plurality of processing units and simultaneously reads or writes these processing units on a plurality of storage media arranged in parallel with each other.

For example, the processing technique that enhances availability uses a redundant data storing system. One example of the redundant data storing system is a method of storing error correcting code (parity code) used for error correction or restoration of processing data. Another example is a method referred to as mirroring.

Currently mainstream storage media of high-capacity storage devices are magnetic storage media (hard disks). The above-described data storage device is therefore referred to also as a disk array device. Incidentally, a technology that enhances the availability of a disk array technology is referred to as RAID (Redundant Arrays of Inexpensive Disks). Examples of applications for disk array devices by the applicant are shown in Patent Document 1 and 2 (See Japanese Patent Laid-open No. 2000-66845 as Patent Document 1 and Japanese Patent Laid-open No. Hei 11-45158 as Patent Document 2).

SUMMARY OF THE INVENTION

Some fault may occur in a storage medium storing processing data and redundant data during operation of a disk array device. In this case, it is necessary to isolate the storage medium in which the fault has occurred from the system and replace the storage medium. For this replacement, there are a method that physically isolates the storage medium in which the fault has occurred from the disk array device and physically connects a new storage medium, and a method that logically isolates the storage medium in which the fault has occurred from the disk array device and logically connects an auxiliary storage medium incorporated in advance.

In both the systems, stored data stored on the storage medium before the replacement needs to be reconstructed on the storage medium after the replacement.

FIG. 1 shows an image of an existing reconstruction process. FIG. 1 shows an image of a reconstruction process when a factor for replacement occurs in one disk device (drive device) in a disk array device including four data disk devices and two parity disk devices.

There are several systems as method for executing a reconstruction command. FIG. 1 shows an image of a process in a case where a reconstruction command is forcefully executed even when processing data input/output commands (read commands/write commands) are generated continuously. FIG. 1 indicates timing of execution of a reconstruction command by dot meshing.

At a time of executing a reconstruction command, as shown in FIG. 1, processing units forming processing data are read from four disk devices other than that to be replaced so that stored data (processing units) stored in the disk device before the replacement is reconstructed. The reconstructed stored data (processing units) is stored in a disk device after the replacement in the same command cycle.

In FIG. 1, the command cycle in which the processing units necessary for the reconstruction are read is denoted by a symbol "R". The command cycle in which the reconstructed stored data (processing units) is written is denoted by a symbol "W".

Thus, in the conventional reconstruction process, the reading of processing units necessary for reconstruction, the reconstruction of stored data, and the writing of the reconstructed stored data are all performed in one command cycle.

This processing method, however, can execute input/output commands only exclusively. Hence, as shown in FIG. 2, when a reconstruction command is forcefully executed while input/output commands are executed continuously, the performance of the input/output process is delayed from original timing. In FIG. 2, the delay in timing of the process is indicated by an arrow inclined with respect to a time base.

The problem of the delay in the original input/output process is presented especially when processing data requiring a high degree of real-time capability is handled and when processing data of large data size is handled.

On the other hand, when the original input/output process is given priority, and a rate of execution of reconstruction commands is decreased or intervals between executions of reconstruction commands are lengthened, the rate of progress of the stored data reconstruction process becomes very slow.

The inventor has directed attention to the above technical problems, and proposes a technique having the following processing functions.

(1) A process of determining whether a number of storage media usable for one of input and output of processing data is not smaller than one plus a number of storage media necessary for one of input and output of processing data when a request for reconstruction of stored data is detected (2) A process of identifying storage media to be operated of the usable storage media when the number of storage media usable for one of the input and output of the processing data is not smaller than one plus the number of storage media necessary for one of the input and output of the processing data (3) A process of specifying one of the storage media to be operated as a storage medium for reconstruction and the other storage media as storage media for one of the input and output of the processing data, and shifting specification of the storage medium for reconstruction in each command cycle (4) A process of performing one of the input and output of the processing data and reading of a processing unit for reconstruction in parallel with each other in accordance with the specification of the storage media, and reconstructing the stored data and recording the reconstructed stored data on a storage medium as a reconstruction destination in a stage in which all of processing units necessary to reconstruct the stored data are prepared.

It is to be noted that these processing functions may be implemented as software processing or may be implemented as hardware processing. In addition, a part of these processes may be implemented by software processing and a remaining part may be implemented by hardware processing.

By employing the technique according to an embodiment of the present invention, the reconstruction process is distributed to a plurality of command cycles and performed. That is, the reading of a processing unit for reconstruction is distributed to a plurality of command cycles and performed in parallel with the input or output of processing data. Then, in a stage in which all of processing units necessary to reconstruct stored data are prepared, the reconstruction of the stored data and the writing of the stored data to a reconstruction destination are performed in parallel with the input or output of processing data.

Thus, even when processing data requiring a high degree of real-time capability or processing data of a large data size is input or output, the reconstruction process can be performed in parallel without causing any delay in inputting or outputting the processing data.

DETAILED DESCRIPTION OF THE PREFERRED EMBODIMENTS

An embodiment of a data storage device employing a technical method according to the present invention will hereinafter be described.

Incidentally, techniques well known or publicly known in a pertinent technical field are applied to parts not specifically shown or described in the present specification.

The embodiment to be described below is one embodiment of the present invention, and therefore the present invention is not limited thereto.

(A) Server System (A-1) System Configuration

Figure 1:
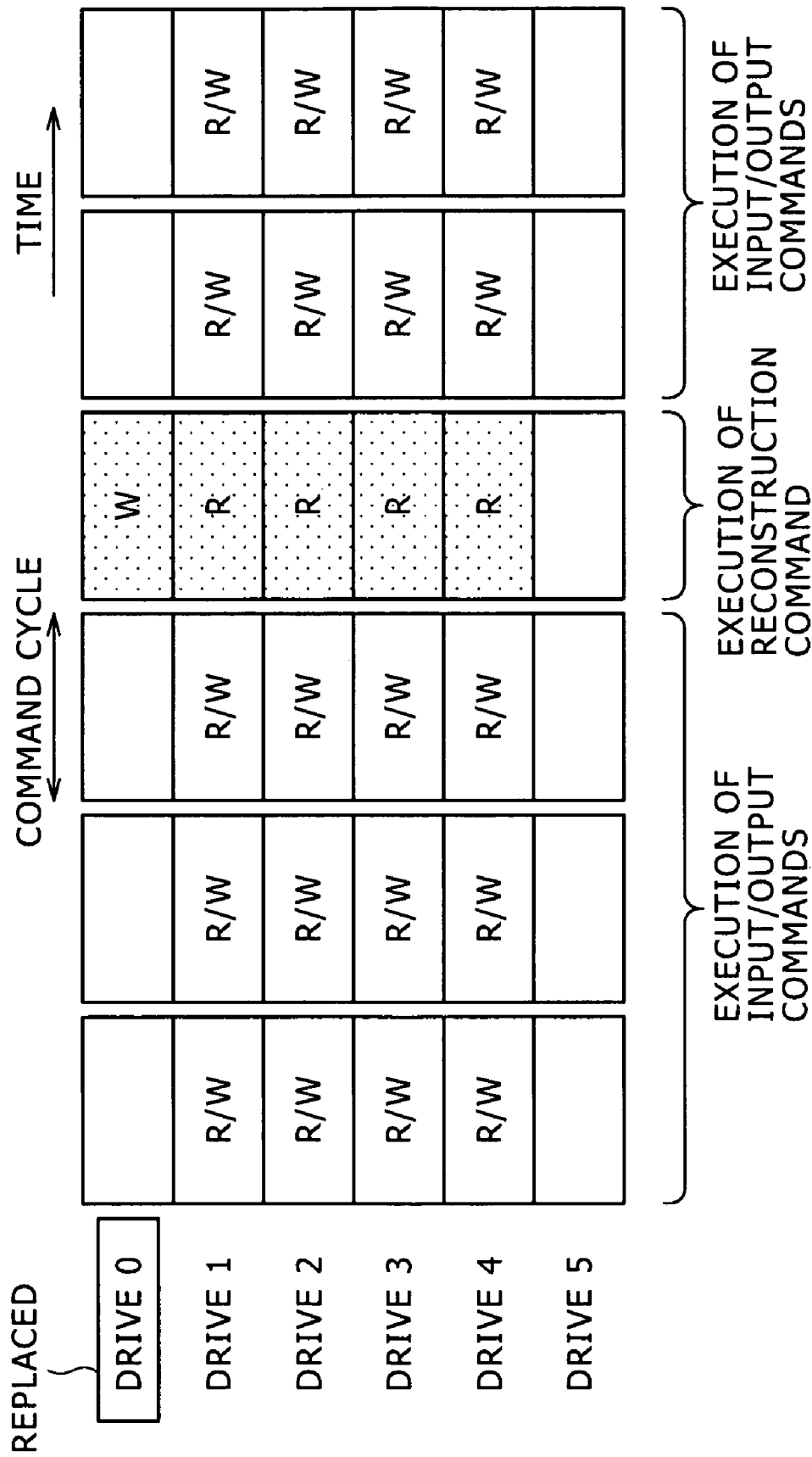
FIG. 1 is a diagram showing a conventional example of an image of a stored data reconstruction process.
Figure 2:
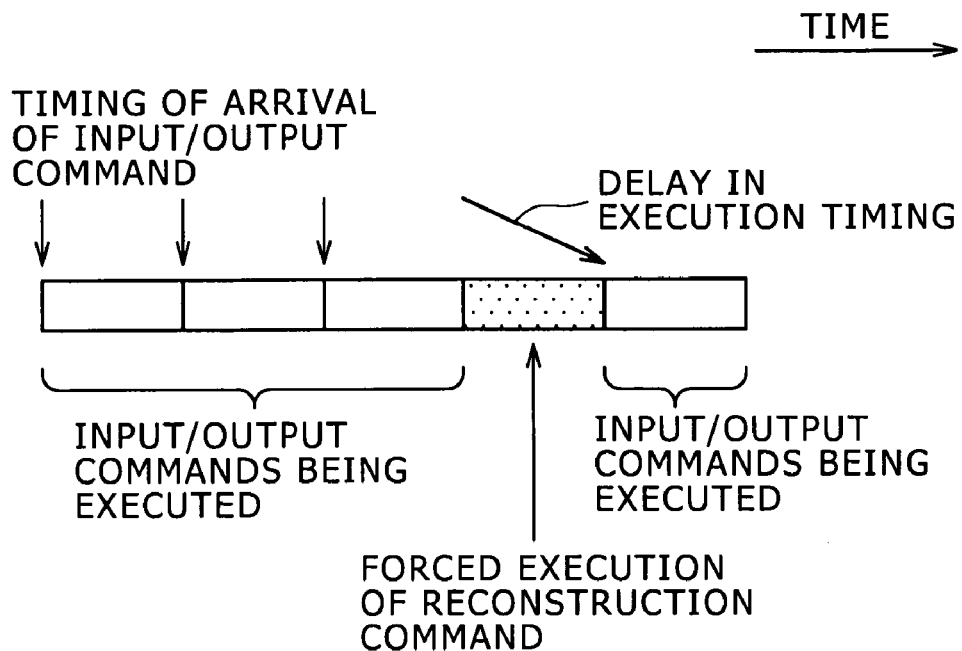
FIG. 2 is a diagram of assistance in explaining a delay in an input/output command as a result of execution of a reconstruction command.
Figure 3:
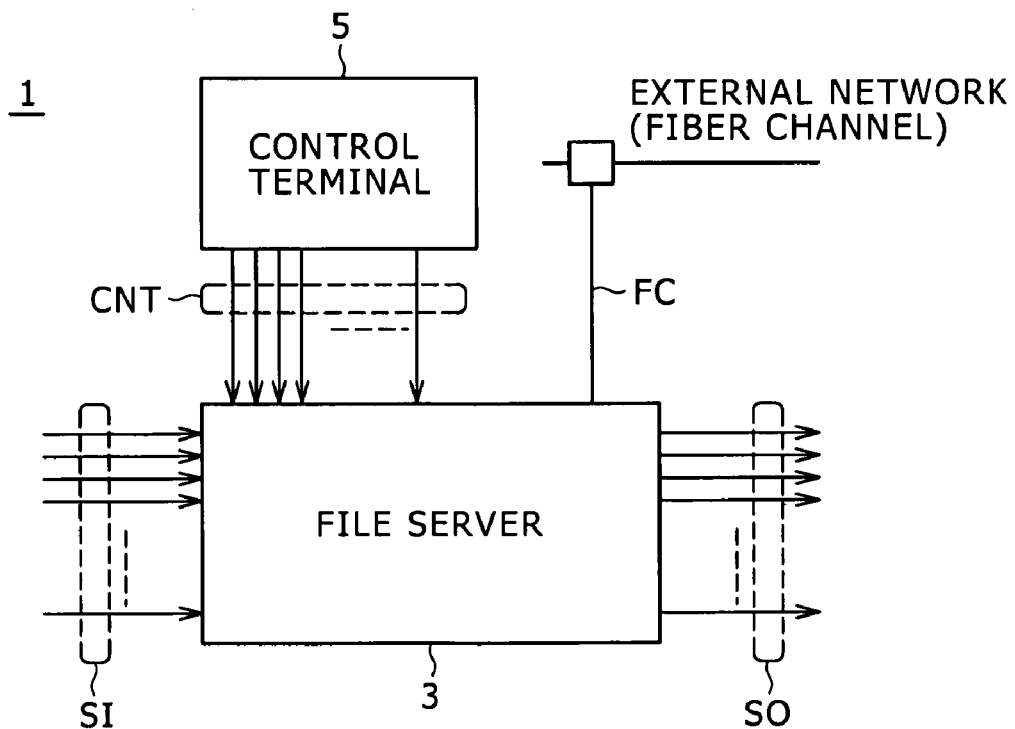
FIG. 3 is a diagram showing an example of configuration of a server system.

FIG. 3 shows an example of configuration of a server system 1. The server system 1 includes a file server 3 and a control terminal 5.

The file server 3 refers to a computer that shares a data storage device (data storage) managed by the computer itself with another terminal in the system and thus allows external use of the data storage device. Of course, details of internal configuration of the file server 3 differ depending on the nature of work to which the file server 3 is applied and purposes thereof. The file server 3 in FIG. 3 has two input-output interfaces. The two input-output interfaces are an interface handling input and output data SI and SO and an interface handling input and output data FC.

The control terminal 5 is a computer that controls the internal operation of the file server 3.

(A-2) File Server

Figure 4:
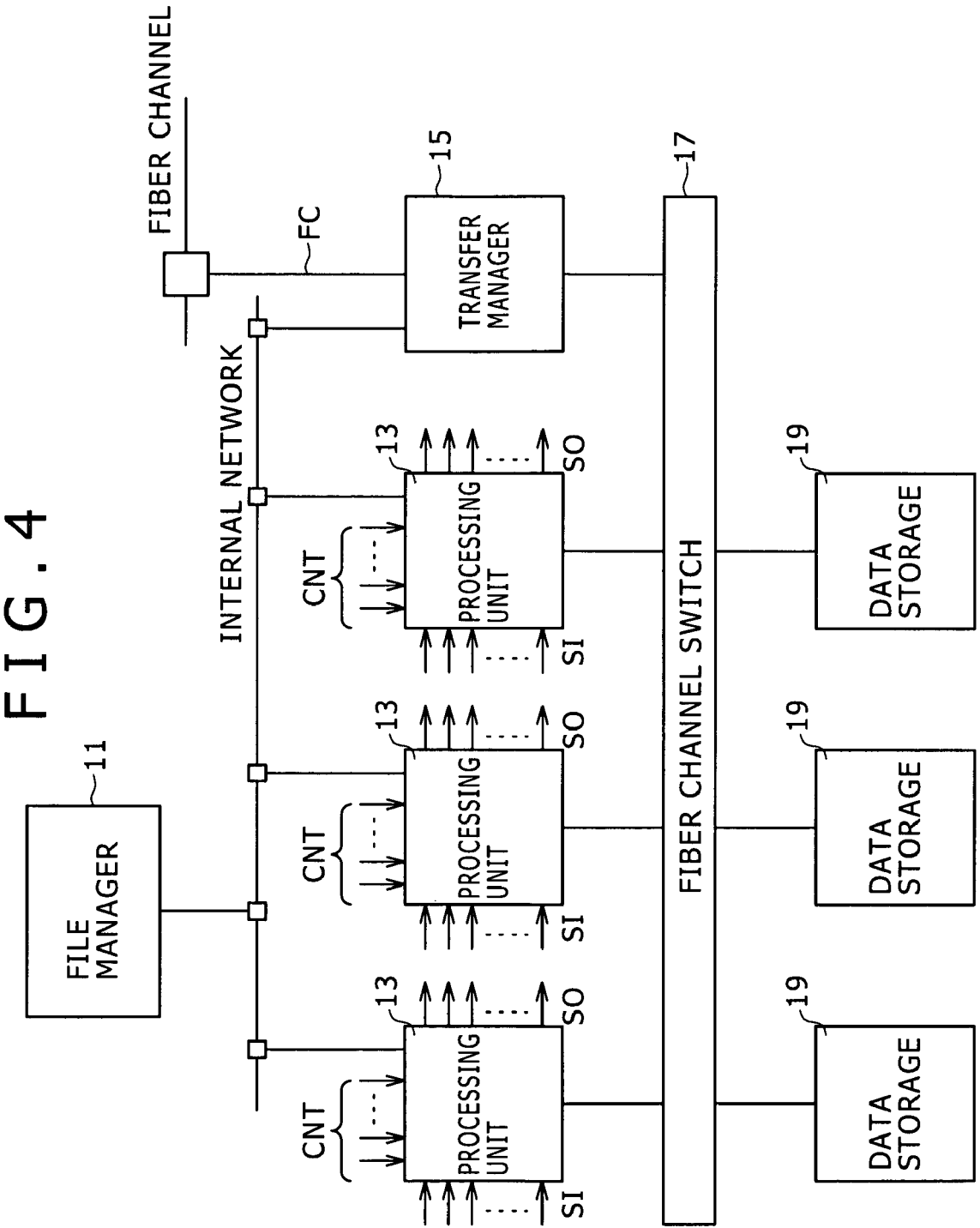
FIG. 4 is a diagram showing an example of internal configuration of a file server.

FIG. 4 shows an example of internal configuration of the file server 3. Incidentally, FIG. 4 shows a case where processing data handled by the system is video data and audio data (voice data, musical piece data and other sound data). That is, FIG. 4 shows a case where the file server 3 is a so-called AV server. In the case of FIG. 4, AV data is input and output from and to a separate external device through serial data interfaces SI and SO and a fiber channel interface FC.

The file server 3 includes a file manager 11, processing units 13, a transfer manager 15, a fiber channel switch 17, and data storages 19.

The file manager 11 is a computer that manages the input and output of AV data within the server.

The processing units 13 are devices that encode and decode the AV data. The processing units 13 are formed by an existing processing board or card, for example. The processing units 13 are supplied with AV data from not only the serial data interface SI but also the fiber channel interface FC. Similarly, processed AV data is output from not only the serial data interface SO but also the fiber channel interface FC. Incidentally, the processing operation of the processing units 13 is controlled by a control signal CNT supplied from the control terminal 5.

The transfer manager 15 is a computer that manages the input and output of AV data between the file server 3 and the fiber channel interface FC as an external network.

The fiber channel switch 17 is a device for relaying AV data transmitted through a fiber channel as an internal channel. Incidentally, the fiber channel as the internal channel is connected with the processing units 13, the transfer manager 15, and the data storages 19.

The data storages 19 are a data storage device used to store AV data. The data storages 19 correspond to a data storage device in claims. The data storages 19 use a disk array device having an error correcting function. In the present embodiment, description will be made of a case where error correcting code is used as redundant data.

(A-3) Data Storage

Figure 5:
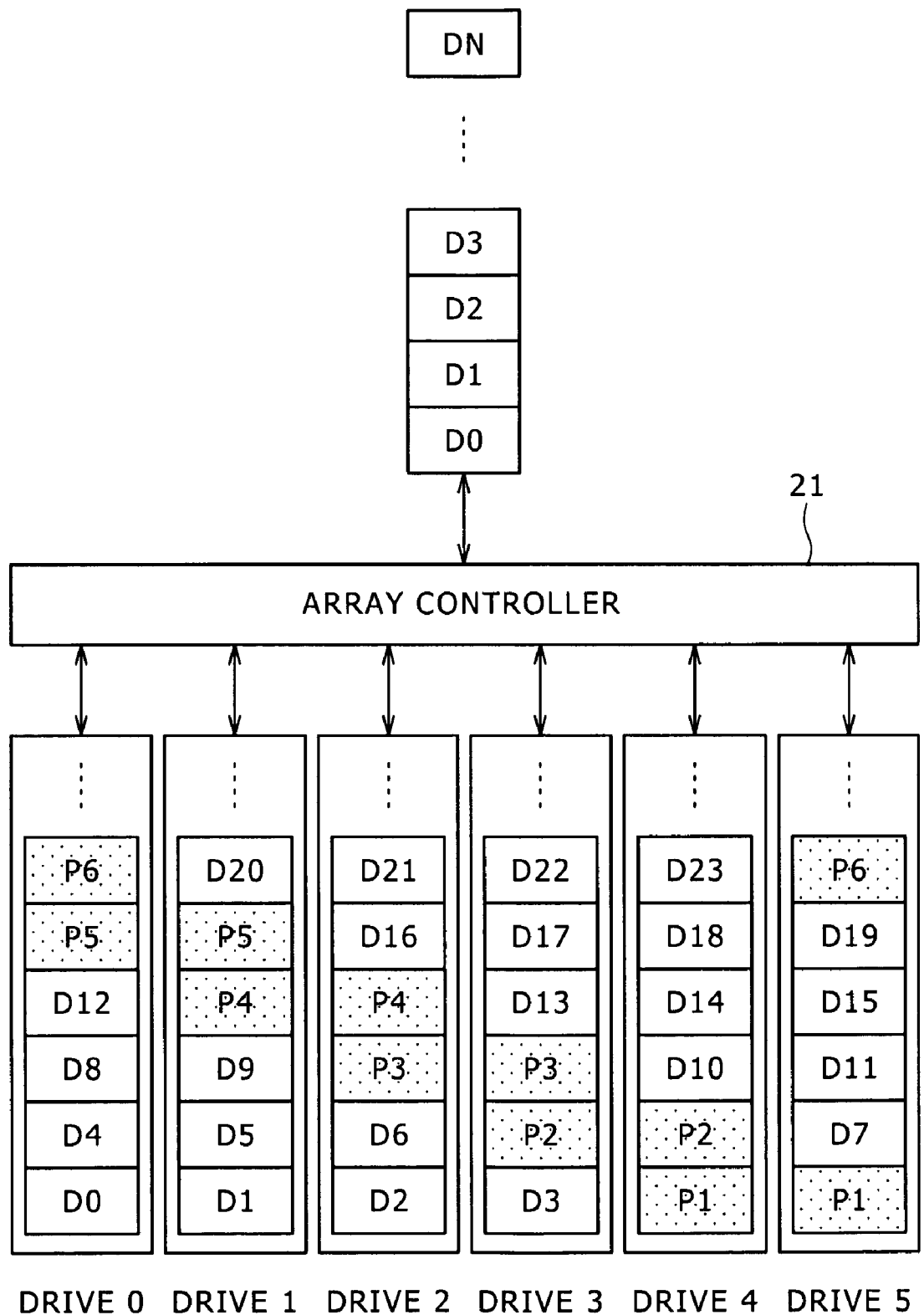
FIG. 5 is a diagram showing a conceptual configuration of a data storage.

Details of configuration of the data storages 19 will be described. FIG. 5 shows a conceptual configuration of a data storage 19 including four data disk devices and two parity disk devices. In this conceptual configuration, the data storage 19 includes an array controller 21 and six hard disk devices (drive devices).

The array controller 21 performs a process of dividing input data (processing data) into a plurality of processing units D0, D1, . . . and DN and then writing the data to the four data disks in a parallel manner, and a process of reading and combining the corresponding processing units D0, D1, . . . and DN from the four data disks, and outputting the processing units D0, D1, . . . and DN as output data (processing data).

This dividing process is referred to as striping. Incidentally, the array controller 21 generates error correcting code (parity data) P at the time of the dividing process.

The error correcting code P is not only referred to at a time of reading processing data to be used to correct errors of output data, but also used to reconstruct stored data at a time of replacing a faulty disk. Incidentally, the error correcting code (parity data) P is recorded onto two hard disk devices (drive devices) at a time so as to be distributed to all the hard disk devices (drive devices).

That is, in each command cycle, of the six drive devices, the four drive devices function as operating drive devices that directly contribute to input or output of processing data, and the two remaining drive devices function as parity drive devices for error correction or reconstruction of processing data.

Figure 6:
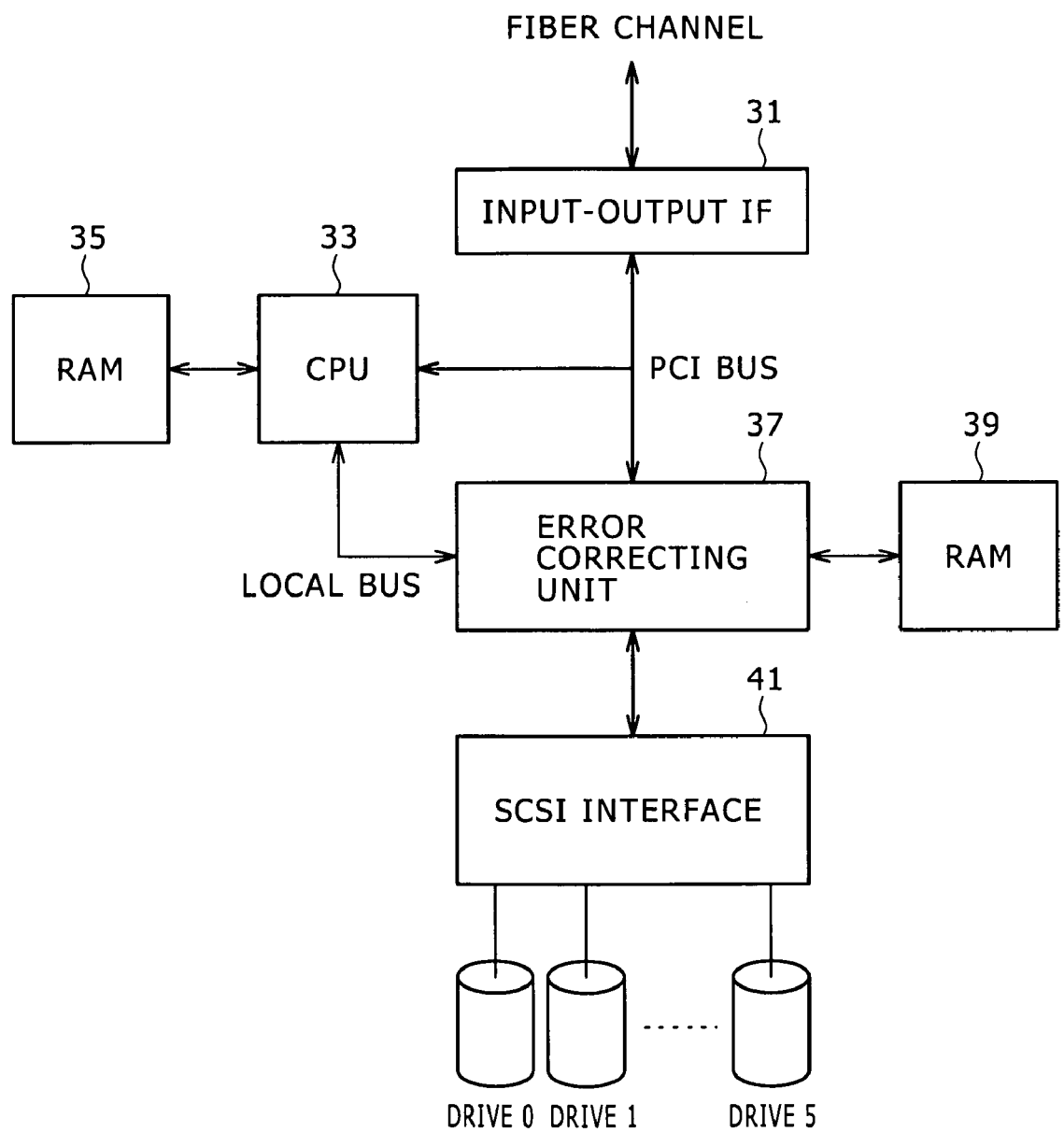
FIG. 6 is a diagram showing an example of hardware configuration of the data storage.

FIG. 6 shows an example of hardware configuration of the data storage 19. The data storage 19 includes an input-output interface 31, a CPU 33, a RAM 35, an error correcting unit 37, a RAM 39, and a SCSI interface 41.

The input-output interface 31 connects the data storage 19 to the fiber channel.

The CPU 33 is a computer that controls the operation of the data storage 19. Functions provided by the CPU 33 are implemented via a program. For example, processes of writing and reading processing data and a process of reconstructing stored data which process is involved in replacing a faulty disk are implemented.

The RAM 35 is a storage area for storing a command (input-output command) accompanying the input and output of processing data given from the file manager 11. That is, the RAM 35 functions as a command queue.

The error correcting unit 37 is a processing device that performs a processing data switching process and a process of generating error correcting code and performing error correction. Incidentally, a destination to which to output processing data (processing unit) is changed by a matrix switch included in the error correcting unit 37.

For example, at a time of writing input data, the matrix switch attaches error correcting code to the processing data input from the input-output interface 31, and then outputs the processing data to the RAM 39. Thereafter, the matrix switch outputs the processing data read from the RAM 39 to the SCSI interface 41.

For example, at a time of reading output data, the matrix switch subjects the processing data input from the SCSI interface 41 to error correction, and then outputs the processing data to the RAM 39. Thereafter, the matrix switch outputs the processing data read from the RAM 39 to the input-output interface 31.

For example, at a time of reconstructing stored data, the matrix switch outputs the processing data input from the SCSI interface 41 to the RAM 39. Next, the matrix switch reconstructs the stored data from the processing data read from the RAM 39, and then outputs the reconstructed stored data to the RAM 39. Thereafter the matrix switch outputs the processing data read from the RAM 39 to the SCSI interface 41.

The RAM 39 is used as a work area for this error correcting process.

The SCSI interface 41 performs a process of dividing processing data and a process of combining processing data between the SCSI interface 41 and the plurality of disk devices. A SAS (Serial Attached SCSI) is used for the SCSI interface 41, for example.

Figure 7:
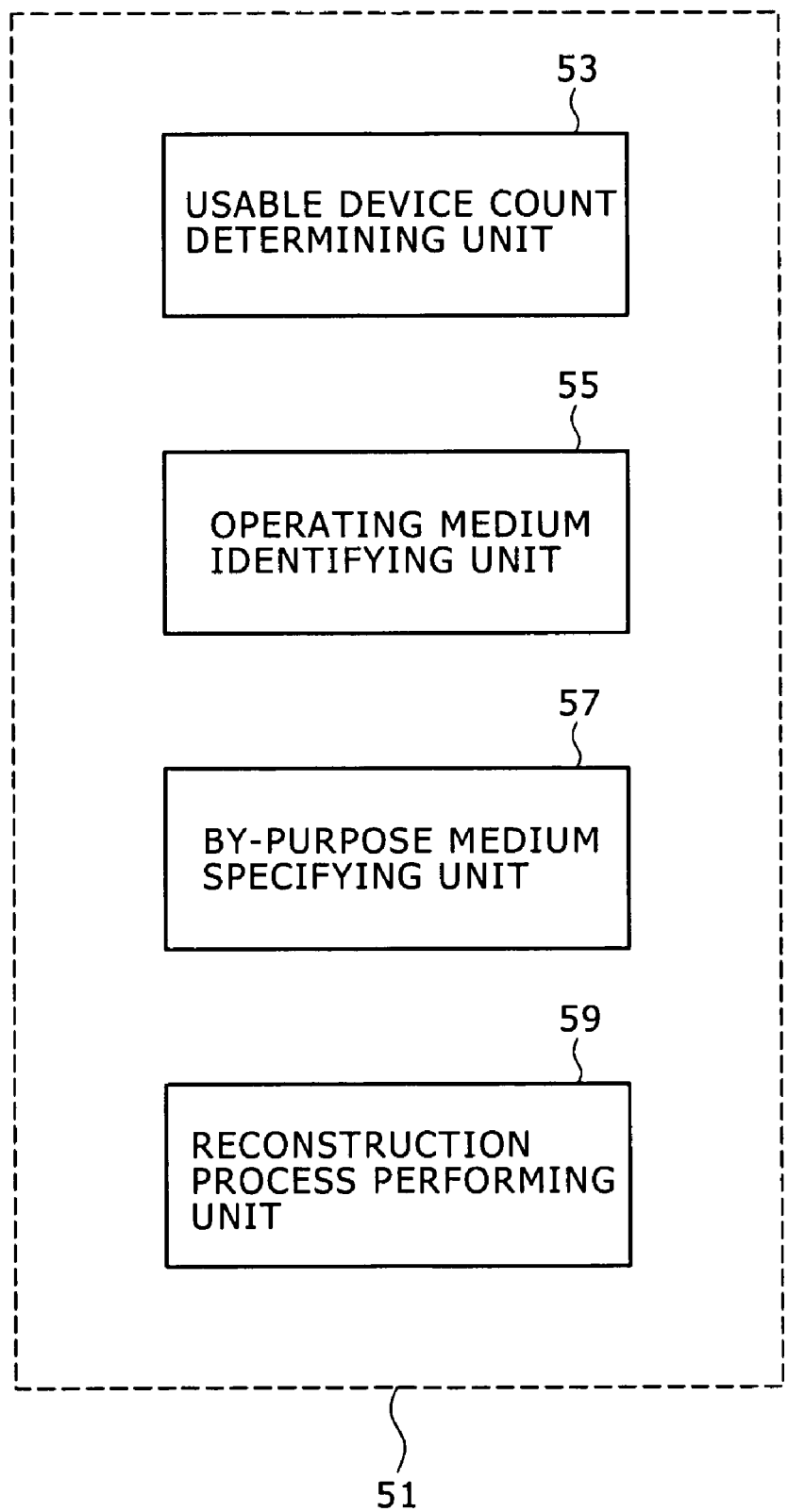
FIG. 7 is a diagram showing an example of functional configuration of a reconstruction control device.

The error correcting unit 37, the RAM 39, and the SCSI interface 41 in FIG. 7 correspond to the array controller 21 in FIG. 5.

(B) Reconstructing Process Function

FIG. 7 shows an example of functional configuration of a reconstruction control device 51 implemented by the CPU 33. This functional configuration is implemented through program processing.

The reconstruction control device 51 includes a usable device count determining unit 53, an operating medium identifying unit 55, a by-purpose medium specifying unit 57, and a reconstruction process performing unit 59.

The usable device count determining unit 53 is a processing device that determines whether the number of disk devices (storage media) usable for input or output of processing data is not smaller than one plus the number of disk devices necessary for input or output of processing data. In this determination, a precondition for performing an input/output process and a reconstruction process in parallel with each other is judged. This determination includes determination of whether the disk devices are operable.

In the present embodiment, the determination is equivalent to determination of whether five or more disk devices including a parity drive device are usable. This is because partial data (processing units) obtained by dividing processing data and parity data (processing units) P are recorded in a state of being distributed to all the six disk devices.

Incidentally, even if an auxiliary disk device (a disk device disposed in a non-operating state in preparation for occurrence of a fault) is included, this disk device has no data recorded therein, and is therefore not usable for input or output of processing data. Hence, it does not suffice to physically have five disk devices, and a condition that disk devices be usable for input or output is required, as described above.

The operating medium identifying unit 55 is a processing device that, when the number of disk devices (storage media) usable for input or output of processing data is not smaller than five, identifies disk devices to be operated of the usable disk devices. In this case, the operating medium identifying unit 55 identifies the five disk devices as operable disk devices.

The by-purpose medium specifying unit 57 is a processing device that specifies one of the disk devices (storage media) to be operated as a disk device for reconstruction and the other disk devices as disk devices for input or output of processing data, and shifts the specification of the disk device for reconstruction in each command cycle.

Specifically, the by-purpose medium specifying unit 57 specifies four of the five disk devices as disk devices for input or output of processing data, and specifies one disk device as a disk device for reading partial data (processing unit) necessary to reconstruct stored data.

Figure 8:
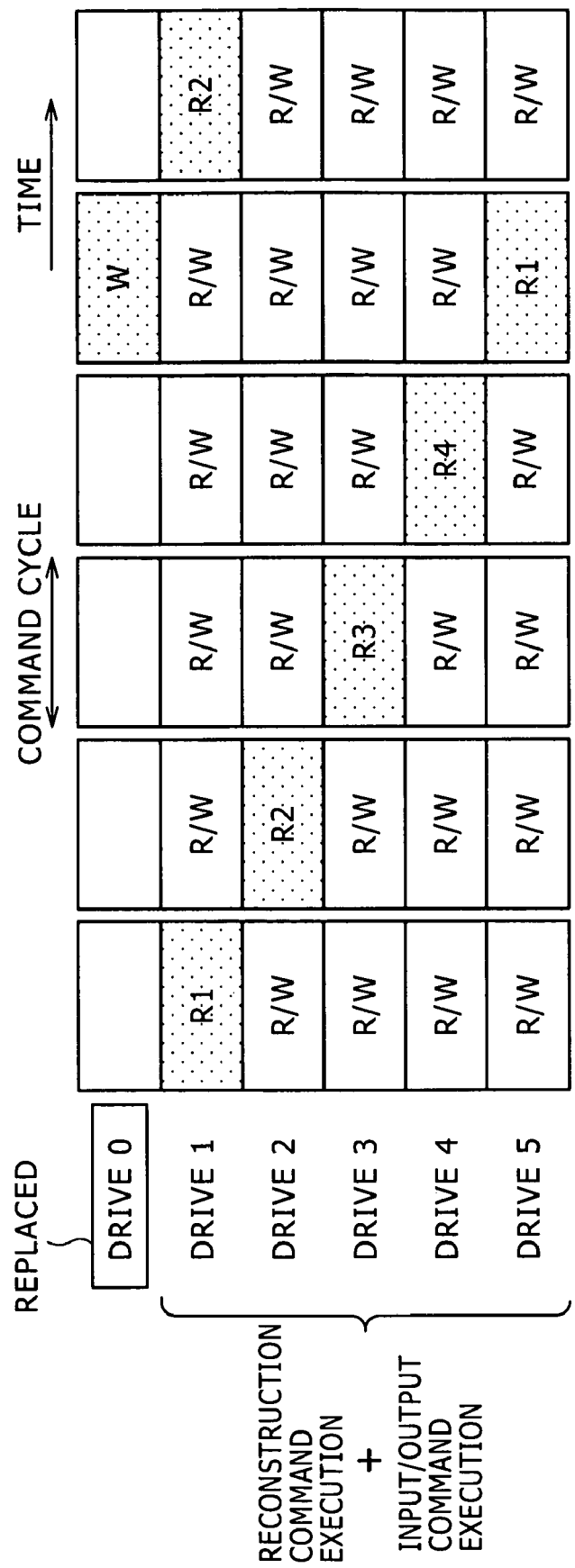
FIG. 8 is a diagram showing an image of a stored data reconstruction process according to an embodiment.

FIG. 8 shows an image of the process. FIG. 8 shows an image of the process when a drive 0 in which a fault has occurred is replaced. Of course, also for stored data reconstruction, four processing units need to be collected from four disk devices. In the present embodiment, however, since reconstruction processing is performed in parallel with the input or output of processing data (since reconstruction processing is background processing), the reading of processing units necessary for reconstruction is distributed to four command cycles.

In the case of FIG. 8, the disk device specified for reconstruction is shifted from a drive 1 to a drive 2 to a drive 3 to a drive 4 in this order in four command cycles. The disk device specified for reconstruction is shifted from a drive 5 to the drive 1 to the drive 2 to the drive 3 in this order in next four command cycles.

Incidentally, the partial data (processing units) read for reconstruction is stored in the RAM 39 until all of the four pieces of partial data (processing units) are prepared.

The reconstruction process performing unit 59 is a processing device that performs the input or output of processing data and the reading of a processing unit for reconstruction in parallel with each other in accordance with the specification of the disk devices according to purposes of the disk devices, and reconstructs stored data and records the reconstructed stored data in a disk device (storage medium) as a reconstruction destination in a stage in which all of processing units necessary to reconstruct the stored data are prepared.

In the case of FIG. 8, for example, the reconstruction process performing unit 59 performs the input or output of processing data using the drives 2 to 5 and the reading of a processing unit for reconstruction using the drive 1 in parallel with each other in a first command cycle. In a next command cycle, the reconstruction process performing unit 59 performs the input or output of processing data using the drives 1 and 3 to 5 and the reading of a processing unit for reconstruction using the drive 2 in parallel with each other. Similar operations are performed in two subsequent command cycles.

When processing units for reconstruction of stored data are read from the drives 1 to 4, the processing units are output from the RAM 39 to the error correcting unit 37 so that the stored data for the drive 0 is reconstructed, and then the reconstructed stored data is stored in the RAM 39. Thereafter the reconstructed stored data (processing units) is output from the RAM 39 through the error correcting unit 37 and the SCSI interface 41 to the drive 0 to be written to the drive 0.

The process of writing to the drive 0 is performed in parallel with the input or output of processing data. In the case of FIG. 8, the stored data (processing units) is written to the drive 0 simultaneously with a start of reading of partial data (processing unit) necessary to reconstruct next stored data.

Figure 9:
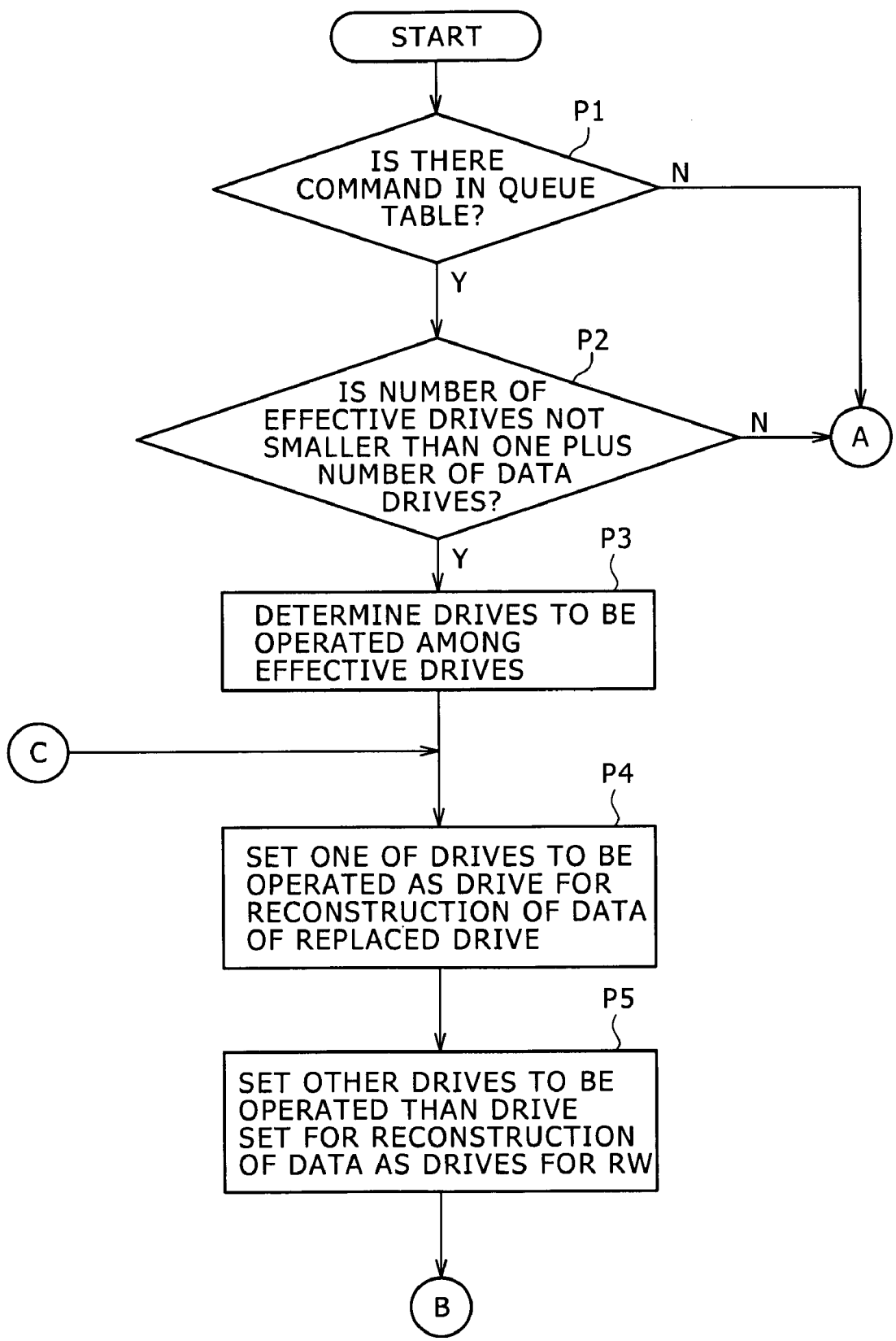
FIG. 9 is a diagram showing an example of a process procedure of a reconstruction process function.
Figure 10:
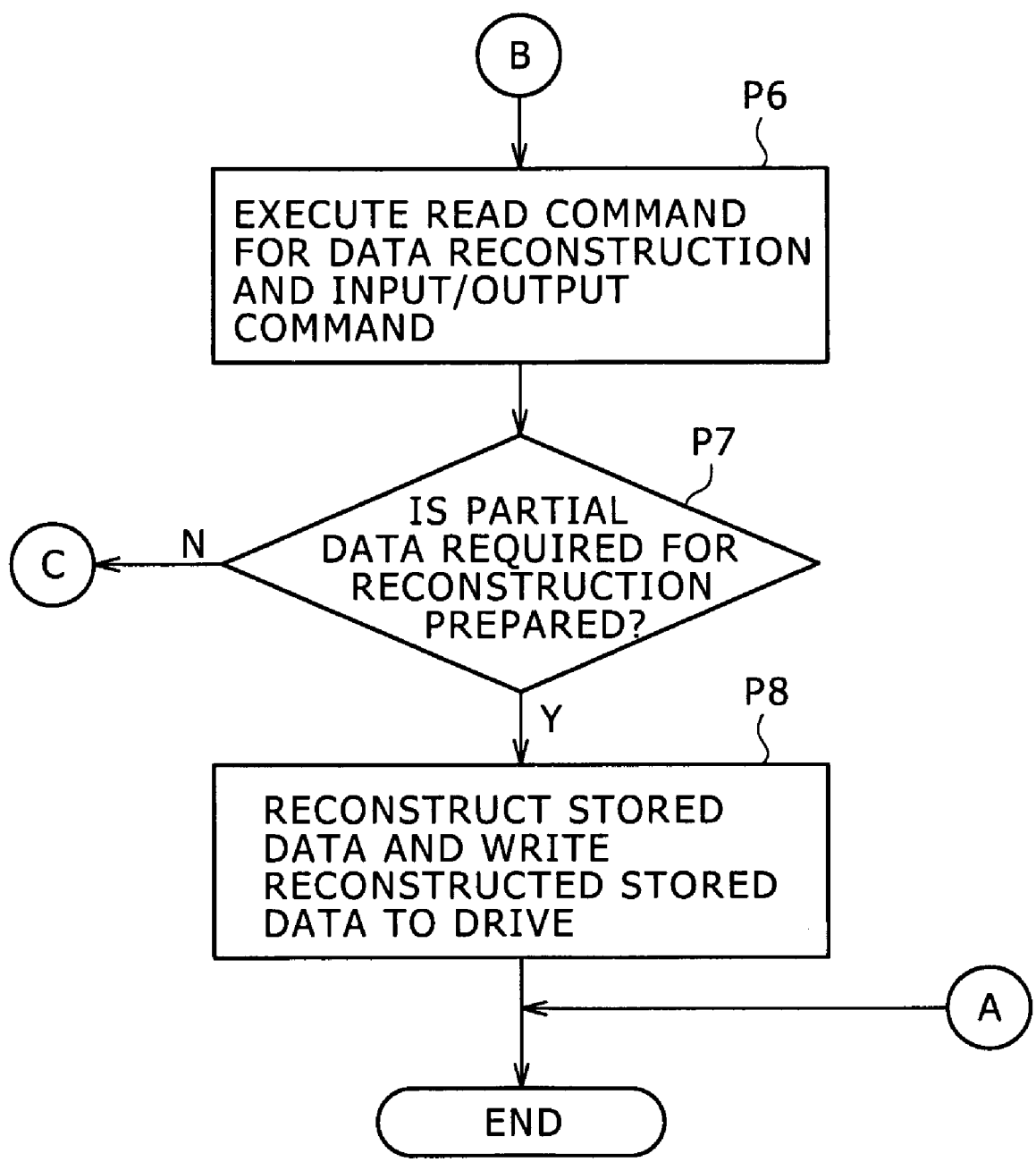
FIG. 10 is a diagram showing the example of the process procedure of the reconstruction process function.

FIG. 9 and FIG. 10 show an example of a process procedure related to the reconstruction process function of the disk array device. This reconstruction process function is implemented by a program that is resident in the CPU 33.

This program first determines whether there is an input/output command in a queue table (RAM 35) (P1). The presence of an input/output command means that the input/output command is being executed or waiting to be processed. Whether the queue table is empty is determined because the stored data reconstruction process can be performed by an existing process method when the queue table is empty. That is, when the queue table is empty, the stored data reconstruction process can be performed by an existing process method because one piece of stored data can be reconstructed within a single command cycle. Hence, when a negative result is obtained in this determining step, the program is ended.

When one or more input/output commands are present (when a positive result is obtained), the program determines whether the number of disk devices (storage media) usable for input or output of processing data is not smaller than one plus the number of disk devices necessary for input or output of processing data (P2). In order to reconstruct stored data in parallel with input or output of processing data, the number of disk devices usable for input or output of processing data needs to be not smaller than one plus the number of disk devices necessary for the input or output of the processing data. In the present embodiment, the program determines whether five or more drive devices are usable for input or output of processing data.

When a negative result is obtained in step P2 (when two or more drive devices are faulty, for example), the program is ended. In the present embodiment, four disk devices can be secured which are usable for input or output of processing data even when two disk devices are faulty. Hence, it is possible to perform only one of the input or output of processing data and the reconstruction of stored data, but it is not possible to perform the two processes in parallel with each other in one command cycle. Thus, when there are less than five disk devices necessary for input or output of processing data, the program is ended.

On the other hand, when there are five or more disk devices necessary for input or output of processing data (when a positive result is obtained), the program determines disk devices (storage media) to be operated of the usable storage media (P3).

This process is effective when there are two or more parity disk devices. This process determines five disk devices to be operated that are used to input or output processing data and reconstruct stored data.

Next, the program specifies one of the disk devices (storage media) to be operated as a disk device for reconstruction and the other disk devices as disk devices for input or output of processing data (P4 and P5). As described with reference to FIG. 8, this process specifies one of the five disk devices as a disk device for reconstruction and specifies the four disk devices as disk devices for input or output.

After the specification of the disk devices, the program performs the input or output of processing data and the reading of a processing unit for reconstruction in parallel with each other (P6). Incidentally, when an input/output command is a write command, processing data input from the fiber channel interface FC is recorded in the operating disk devices. When an input/output command is a read command, processing data read from the operating disk devices is output to the fiber channel interface FC.

The program next determines whether all of processing units necessary to reconstruct stored data are prepared (P7). This is because the processing units need to be collected from four different disk devices in order to reconstruct the stored data.

When not all of the processing units are prepared (when a negative result is obtained), the program returns to process P4. Specifically, the program specifies one disk device as a new disk device to be used for reconstruction and the four other disk devices as disk devices for input or output of processing data (P4 and P5).

When a positive result is eventually obtained in process P7 (when the four processing units necessary to reconstruct the stored data are prepared), the program reconstructs the stored data using the four read processing units, and outputs the reconstructed stored data to a disk device after replacement (P8).

By repeating this process, the stored data reconstruction process is surely performed. In the case of FIG. 8, stored data reconstruction is performed once in every four command cycles.

Figure 11:
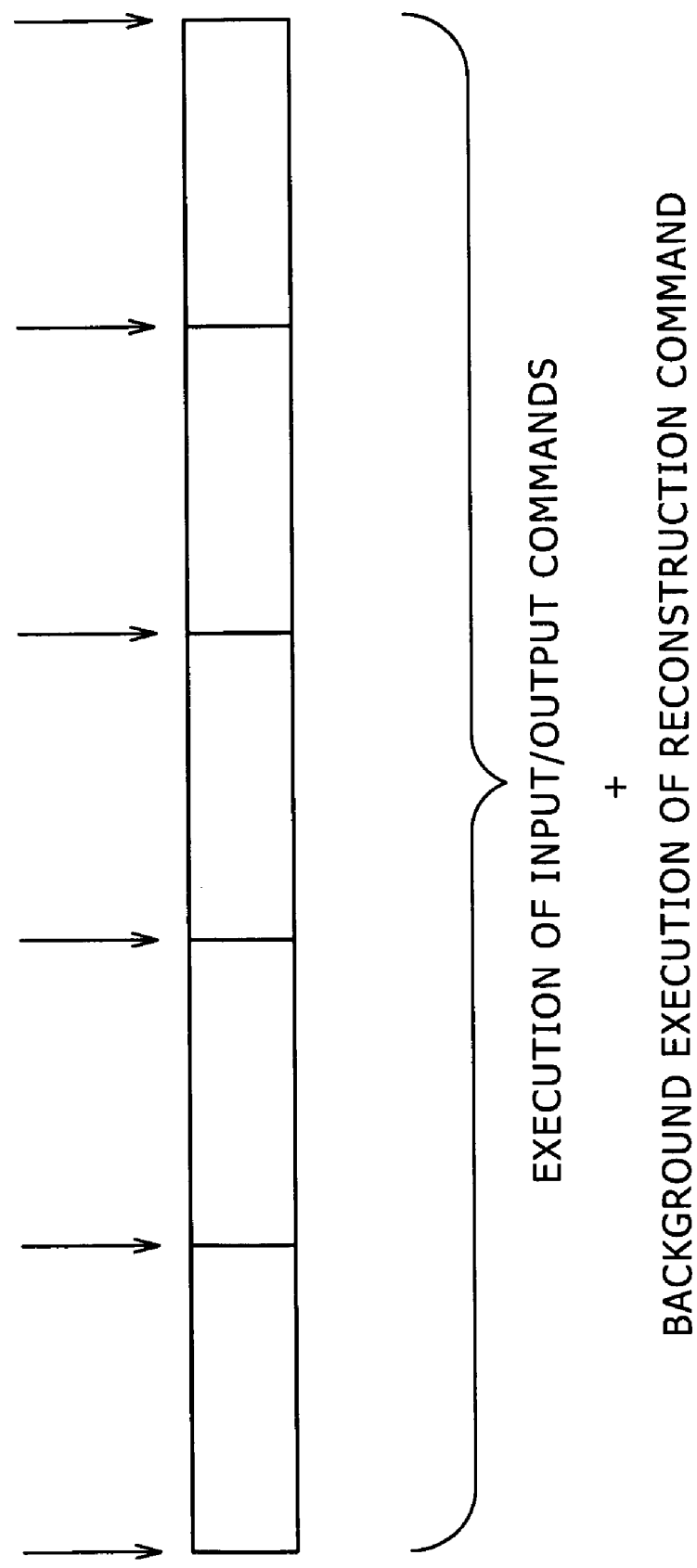
FIG. 11 is a diagram showing an image of performance of an input or output process and a reconstruction process.

FIG. 11 shows an image of the reconstruction process implemented by the program.

As shown in FIG. 11, no delay in execution of input/output commands is caused in principle. That is, the process of inputting or outputting processing data can be performed without a delay even during the stored data reconstruction process. Of course, stored data reconstruction is surely performed once in every four command cycles, and therefore a time required for the reconstruction process is shortened.

(C) Effects

As described above, the use of the reconstruction technique according to the present embodiment makes it possible to accelerate the progress of the stored data reconstruction process while minimizing delay in executing an input/output command.

The present invention is therefore suitable for data storages handling processing data of a large data size and processing data requiring a high level of real-time capability. For example, the present invention is suitable for data storages handing AV data.

(D) Other Embodiments (a) In the foregoing embodiment, description has been made of a disk array device in which two parity disk devices are provided for four data disk devices.

However, the technique described in the embodiment can be similarly applied to disk array devices in which two or more parity disk devices are provided for data disk devices. For example, a disk array device may have two data disk devices and two parity disk devices. Alternatively, for example, a disk array device may have two data disk devices and three parity disk devices.

(b) In the foregoing embodiment, description has been made of a case where all the operating disk devices are assigned in order as disk device used for reconstruction of stored data. Specifically, as shown in FIG. 5, all of the five drives 1 to 5 are used.

Figure 12:
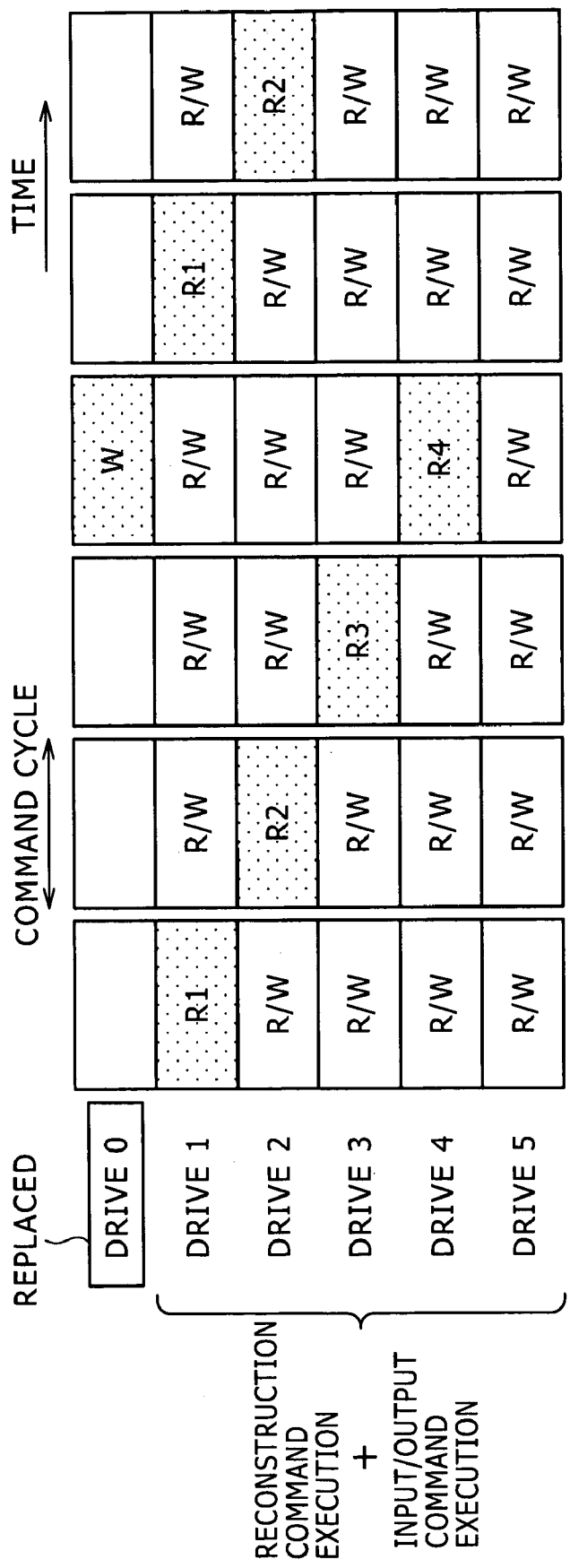
FIG. 12 is a diagram showing an image example of another stored data reconstruction process.

However, a method of using only a part of operating disk devices for reconstruction as illustrated in FIG. 12 may be applied. In the case of FIG. 12, only four drives 1 to 4 are used to be read for reconstruction.

(c) In the foregoing embodiment, description has been made of a method of writing reconstructed stored data in a command cycle next to a command cycle in which all of four processing units necessary to reconstruct the stored data are prepared. Specifically, description has been made of a case where reconstructed stored data is written in a command cycle next to a command cycle in which a fourth processing unit is read. In FIG. 8, writing timing is denoted by a symbol "W".

However, as shown in FIG. 12, a method may be applied which writes reconstructed stored data in the same command cycle in which all of four processing units necessary to reconstruct the stored data are prepared.

(d) In the foregoing embodiment, description has been made of a case where a fiber channel interface FC is used to transmit and receive processing data.

However, other LAN interfaces may be used.

(e) In the foregoing embodiment, description has been made of a case where a magnetic disk device (so-called hard disk device) is used as a storage medium forming a data storage device.

However, other kinds of storage medium may be applied to the storage medium forming the data storage device. For example, semiconductor memories may be used in a state of being arranged in the form of an array. This configuration enables data input and output at higher speeds.

(f) In the foregoing embodiment, description has been made of a file server connected to a fiber channel. That is, description has been made of a large-sized storage system including a plurality of data storages as shown in FIG. 4.

However, the present invention is similarly applicable to storage systems including one data storage. Incidentally, the storage system is applicable not only to systems for business use including for example data storage servers for broadcasting service, data distribution service, communication service, medical data servers, administrative agencies, research institutes, companies and the like but also to systems used by individuals or in households.

(g) Various modifications of the foregoing embodiment can be considered within the scope of the spirit of the present invention. In addition, various modifications and applications created on the basis of the description in the present specification can be considered.

It should be understood by those skilled in the art that various modifications, combinations, sub-combinations and alterations may occur depending on design requirements and other factors insofar as they are within the scope of the appended claims or the equivalents thereof.

What is claimed is:

1. A data storage device capable of performing one of input and output of processing data even when a plurality of storage media are faulty simultaneously, said data storage device comprising:

a usable medium count determining unit for determining whether a number of storage media usable for one of input and output of processing data is not smaller than one plus a number of storage media necessary for one of input and output of processing data when a request for reconstruction of stored data is detected;

an operating medium identifying unit for identifying storage media to be operated of the usable storage media when the number of storage media usable for one of the input and output of the processing data is not smaller than one plus the number of storage media necessary for one of the input and output of the processing data;

a by-purpose medium specifying unit for specifying one of the storage media to be operated as a storage medium for reconstruction and the other storage media as storage media for one of the input and output of the processing data, and shifting specification of the storage medium for reconstruction in each command cycle; and a reconstruction process performing unit for performing one of the input and output of the processing data and reading of a processing unit for reconstruction in parallel with each other in accordance with the specification of said storage media, and reconstructing the stored data and recording the reconstructed stored data on a storage medium as a reconstruction destination in a stage in which all of processing units necessary to reconstruct the stored data are prepared.

2. The data storage device as claimed in claim 1, wherein a parity data storage medium is duplexed.

3. The data storage device as claimed in claim 1, wherein said processing data is data of a large data size.

4. The data storage device as claimed in claim 1, wherein said processing data is data requiring a high degree of real-time capability.

5. A reconstruction controlling device for controlling an operation of reconstructing stored data in a data storage device capable of performing one of input and output of processing data even when a plurality of storage media are faulty simultaneously, said reconstruction controlling device comprising:
  a usable medium count determining unit for determining whether a number of storage media usable for one of input and output of processing data is not smaller than one plus a number of storage media necessary for one of input and output of processing data when a request for reconstruction of stored data is detected;
  an operating medium identifying unit for identifying storage media to be operated of the usable storage media when the number of storage media usable for one of the input and output of the processing data is not smaller than one plus the number of storage media necessary for one of the input and output of the processing data;
  a by-purpose medium specifying unit for specifying one of the storage media to be operated as a storage medium for reconstruction and the other storage media as storage media for one of the input and output of the processing data, and shifting specification of the storage medium for reconstruction in each command cycle; and
  a reconstruction process performing unit for performing one of the input and output of the processing data and reading of a processing unit for reconstruction in parallel with each other in accordance with the specification of said storage media, and reconstructing the stored data and recording the reconstructed stored data on a storage medium as a reconstruction destination in a stage in which all of processing units necessary to reconstruct the stored data are prepared.

6. The reconstruction controlling device as claimed in claim 5, wherein a parity data storage medium is duplexed.

7. The reconstruction controlling device as claimed in claim 5, wherein said processing data is data of a large data size.

8. The reconstruction controlling device as claimed in claim 5, wherein said processing data is data requiring a high degree of real-time capability.

9. A reconstruction controlling method for controlling an operation of reconstructing stored data in a data storage device capable of performing one of input and output of processing data even when a plurality of storage media are faulty simultaneously, said reconstruction controlling method comprising the steps of:
  determining whether a number of storage media usable for one of input and output of processing data is not smaller than one plus a number of storage media necessary for one of input and output of processing data when a request for reconstruction of stored data is detected;
  identifying storage media to be operated of the usable storage media when the number of storage media usable for one of the input and output of the processing data is not smaller than one plus the number of storage media necessary for one of the input and output of the processing data;
  specifying one of the storage media to be operated as a storage medium for reconstruction and the other storage media as storage media for one of the input and output of the processing data;
  performing one of the input and output of the processing data and reading of a processing unit for reconstruction in parallel with each other in accordance with specification of said storage media;
  shifting specification of the storage medium for reconstruction in each command cycle until all of processing units necessary to reconstruct the stored data are prepared;
  performing one of input and output of processing data and reading of a processing unit for reconstruction in parallel with each other in accordance with specification of said storage media after the shifting; and
  reconstructing the stored data and recording the reconstructed stored data on a storage medium as a reconstruction destination in a stage in which all of the processing units necessary to reconstruct the stored data are prepared.

10. A storage medium on which a program is recorded, said program making a computer for controlling an operation of reconstructing stored data in a data storage device capable of performing one of input and output of processing data even when a plurality of storage media are faulty simultaneously perform the steps of:
  determining whether a number of storage media usable for one of input and output of processing data is not smaller than one plus a number of storage media necessary for one of input and output of processing data when a request for reconstruction of stored data is detected;
  identifying storage media to be operated of the usable storage media when the number of storage media usable for one of the input and output of the processing data is not smaller than one plus the number of storage media necessary for one of the input and output of the processing data;
  specifying one of the storage media to be operated as a storage medium for reconstruction and the other storage media as storage media for one of the input and output of the processing data;
  performing one of the input and output of the processing data and reading of a processing unit for reconstruction in parallel with each other in accordance with specification of said storage media;
  shifting specification of the storage medium for reconstruction in each command cycle until all of processing units necessary to reconstruct the stored data are prepared;
  performing one of input and output of processing data and reading of a processing unit for reconstruction in parallel with each other in accordance with specification of said storage media after the shifting; and
  reconstructing the stored data and recording the reconstructed stored data on a storage medium as a reconstruction destination in a stage in which all of the processing units necessary to reconstruct the stored data are prepared.

* * * * *